(12) United States Patent
Eschbach et al.

(10) Patent No.: US 9,589,217 B2
(45) Date of Patent: Mar. 7, 2017

(54) AUGMENTING BARCODES WITH SECONDARY ENCODING FOR ANTI-COUNTERFEITING

(71) Applicant: Xerox Corporation, Norwalk, CT (US)

(72) Inventors: Reiner Eschbach, Webster, NY (US); Raja Bala, Pittsford, NY (US); Saurabh Prabhat, Webster, NY (US); Judith E. Stinehour, Rochester, NY (US)

(73) Assignee: Xeroc Corporation, Norwalk, CT (US)

( * ) Notice: Subject to any disclaimer, the term of this patent is extended or adjusted under 35 U.S.C. 154(b) by 0 days.

(21) Appl. No.: 14/326,682

(22) Filed: Jul. 9, 2014

(65) Prior Publication Data

US 2016/0012324 A1   Jan. 14, 2016

(51) Int. Cl.
  *G06K 7/10* (2006.01)
  *G06K 19/06* (2006.01)
  *G06K 1/12* (2006.01)
  *G06K 15/02* (2006.01)

(52) U.S. Cl.
  CPC ....... *G06K 19/06037* (2013.01); *G06K 1/121* (2013.01); *G06K 15/021* (2013.01); *G06K 19/06056* (2013.01)

(58) Field of Classification Search
  CPC ............. G06K 19/06; G06K 19/06009; G06K 19/06037
  See application file for complete search history.

(56) References Cited

U.S. PATENT DOCUMENTS

| | | | |
|---|---|---|---|
| 5,978,009 A | 11/1999 | Fujikura | |
| 7,639,392 B2 | 12/2009 | Li et al. | |
| 7,936,901 B2 | 5/2011 | Jancke | |
| 7,938,330 B2* | 5/2011 | Kiuchi et al. | 235/454 |
| 8,038,064 B2 | 10/2011 | Ming et al. | |

(Continued)

FOREIGN PATENT DOCUMENTS

CN    1324056 A  * 11/2001
EP    0422220 A1    4/1991

OTHER PUBLICATIONS

Lin et al. "Artistic QR Code Embellishment". 2013. John Wiley &sons Ltd. vol. 32. pp. 137-146.*

(Continued)

*Primary Examiner* — Thien M Le
*Assistant Examiner* — Asifa Habib
(74) *Attorney, Agent, or Firm* — Fox Rothschild LLP

(57) ABSTRACT

A system generates a secure barcode by: identifying a primary pattern for a two-dimensional barcode to be printed on a substrate, wherein the primary pattern comprises of a set of dark cells and a set of light cells; identifying a two-dimensional micro-shape, wherein the micro-shape has a size that is no larger than a size of each cell of the two-dimensional barcode; generating a secondary pattern comprising a plurality of the micro-shapes; and superimposing the secondary pattern with the primary pattern for the two-dimensional barcode to yield a secure barcode. The resulting two-dimensional barcode includes a primary pattern comprising a set of dark cells and a set of light cells, where the sets represent encoded data, along with a secondary pattern of micro-shapes that are superimposed with the primary pattern.

15 Claims, 7 Drawing Sheets

(56) References Cited

U.S. PATENT DOCUMENTS

| | | |
|---|---|---|
| 8,047,447 B2 | 11/2011 | Bulan et al. |
| 8,218,207 B1 | 7/2012 | Harrison, Jr. |
| 8,500,026 B2 | 8/2013 | Fan et al. |
| 8,550,367 B2 | 10/2013 | Fan et al. |
| 2005/0284236 A1 | 12/2005 | Kielb et al. |
| 2006/0098241 A1* | 5/2006 | Cheong et al. ............... 358/463 |
| 2009/0242649 A1* | 10/2009 | Mizukoshi ....... G06K 19/06037 235/494 |
| 2011/0186632 A1 | 8/2011 | Yi et al. |
| 2012/0118970 A1 | 5/2012 | Zolotov |
| 2013/0215473 A1 | 8/2013 | Fan et al. |
| 2013/0228630 A1 | 9/2013 | Fan et al. |
| 2013/0343645 A1 | 12/2013 | Dalal et al. |

OTHER PUBLICATIONS

Wu, Jiaming. "Printed Shape of fast responded matrix code symbols." Jul. 11, 2001. English Translation Jun. 26, 2016.*
Groff, et al., "Invertible Piecewise Linear Approximations for Color Reproduction", Proceedings of the 1998 IEEE, International Conference on Control Applications, Trieste, Italy, Sep. 1-4, 1998, pp. 716-720.

* cited by examiner

AUGMENTING BARCODES WITH SECONDARY ENCODING FOR ANTI-COUNTERFEITING

BACKGROUND

Barcodes are ubiquitous in our daily lives. Virtually every mobile phone can read various types of barcodes. Examples of barcodes include DataMatrix codes, PDF417 codes, Quick Response (QR) codes, Aztec codes, Maxi codes, and the like. Barcodes may be used for any number of purposes, from product identification and authentication, to the creation of coupons, to the addressing of poetry on the World Wide Web.

A barcode may be scanned and read by a wide variety of devices, including but not limited to cellular telephones, digital cameras, smartphones, personal digital assistants, tablet devices, electronic readers, personal computers and portable satellite navigation devices. The generation of various barcodes may be governed by established international standards, such as ISO/IEC 18004:2006 covering quick response (QR) codes, and any successor or replacement standard.

Barcodes have been used in several secure document applications, such as the generation and printing of tickets for admission to an event, or the creation of product packaging with barcodes that are used for supply chain tracking purposes. However, there are not sufficient protections in current barcodes that will prevent someone from making a copy that appears to be any different from the original barcode. Typically, the protections simply consist of written warnings against copying, which provide no technical safeguard against copying. Others print additional security patterns near the barcode, or superimpose holographic images on the barcode, each of which requires complex image capturing and processing techniques.

This document describes an augmented barcode, and a method of making it, that helps to guard against counterfeiting of documents that include the barcode.

SUMMARY

In various embodiments, a system including a processor (which may be a single processor or two or more processors), a computer-readable memory, and programming instructions to generate the secure barcode by (i) identifying a primary pattern for a secure barcode. The system generates a two-dimensional barcode to be printed on a substrate. wherein the primary pattern comprises of a set of dark cells and a set of light cells; (ii) identifying a two-dimensional micro-shape, wherein the micro-shape has a size that is no larger than a size of each cell of the two-dimensional barcode; (iii) generating a secondary pattern comprising a plurality of the micro-shapes; (iv) superimposing the secondary pattern with the primary pattern for the two-dimensional barcode to yield a secure barcode; and (v) storing a file comprising instructions to output the secure barcode with the primary pattern and the superimposed secondary pattern. The storing may be in a long-term memory for later use, or in short-term memory for immediate or near-term printing. The system may then transmit a command to a printer to print secure barcode with the primary pattern and the superimposed secondary pattern, and the printer may print the secure barcode on a substrate.

Optionally, when superimposing the secondary pattern with the primary pattern, the system may identify a set of cell blocks in the two-dimensional barcode and, for each cell of a particular density level in a particular cell block of the two-dimensional barcode that, when printed, will include a data element, replace the cell with the micro-shape. In one embodiment, superimposing the secondary pattern with the primary pattern for the two-dimensional barcode may include replacing each dark cell with one of the micro-shapes so that all of the dark cells of the barcode maintain a substantially uniform density after the superimposing is complete. Alternatively, superimposing the secondary pattern with the primary pattern for the two-dimensional barcode may include replacing each light cell with one of the micro-shapes so that all of the light cells of the barcode maintain a substantially uniform density after the superimposing is complete.

In one embodiment, generating the secondary pattern may include randomly selecting orientation of the micro-shapes so that the micro-shapes, when placed in the cells, exhibit varying orientations. Alternatively or in addition, generating the secondary pattern may include selecting a micro-shape template from a library of micro-shape templates and applying the selected micro-shape template to the primary pattern.

Optionally, generating the secondary pattern comprising the sequence of the micro-shapes may include identifying a synchronization pattern for the two-dimensional barcode, identifying a set of cell blocks within the synchronization pattern, and applying the micro-shape to a plurality of cells within each of the cell blocks.

In another embodiment, a two-dimensional barcode includes: (i) a primary pattern comprising a set of dark cells and a set of light cells that represent encoded data; and (ii) a secondary pattern that is superimposed with the primary pattern. The secondary pattern includes a set of micro-shapes, and each micro-shape has a size that is no larger than a size of each cell of the primary pattern. Optionally, the micro-shapes may exhibit varying orientations throughout the barcode.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Figure 1:
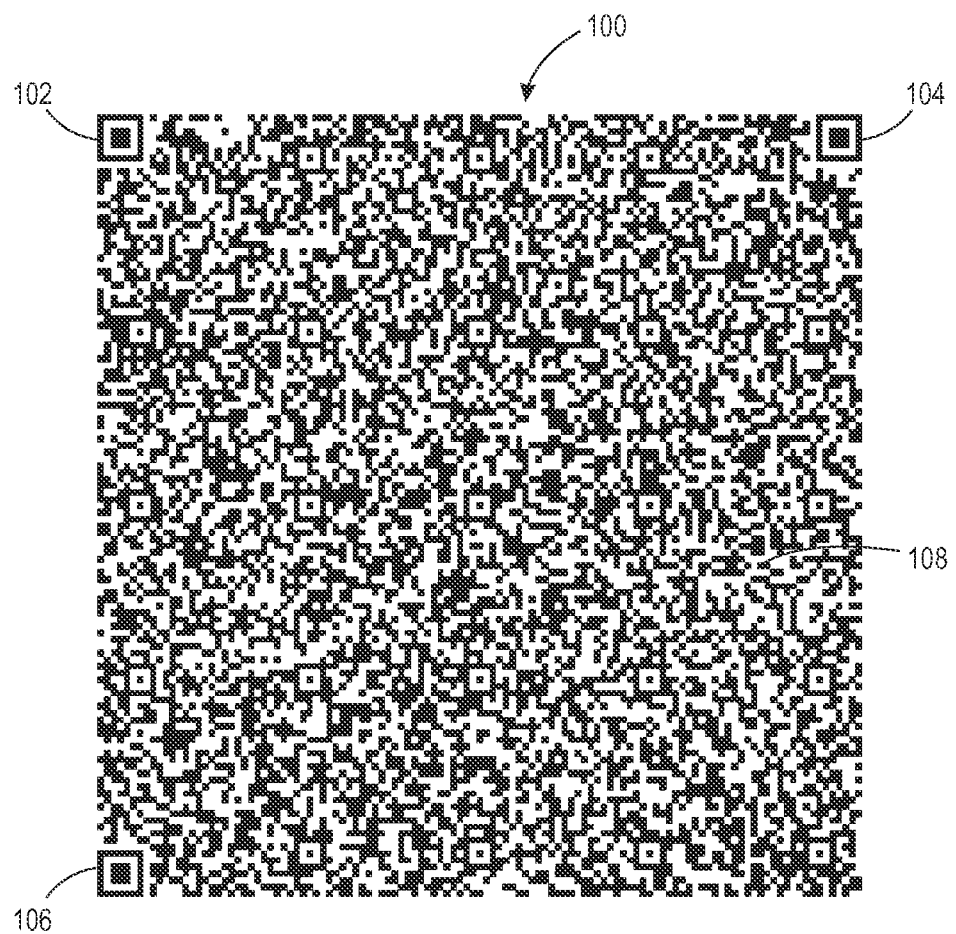
FIG. 1 depicts an example of a two-dimensional barcode of the prior art.

As used in this document, a "barcode" is a pattern or symbol that that is displayed on a surface and which includes encoded data. A barcode may be an optical, machine-readable representation of data. Barcodes may include, without limitation, one-dimensional symbologies, two-dimensional (2D) symbologies, or three-dimensional symbologies. Examples of two-dimensional barcodes include DataMatrix codes, quick response (QR) codes, Aztec codes, PDF417 codes, Maxi codes and the like. FIG. 1 illustrates an example of a 2D barcode of the type known as a quick response (QR) code 100. This barcode 100 may contain one or more position detection elements 102, 104, 106 and a data portion 108 made of a set of informational elements. Each element may be a cell or a group of cells and may be displayed on a screen of an electronic device or printed on a substrate.

As used in this document, a "micro-shape" means a shape that is superimposed on a cell of a barcode. Each micro-shape has a size that does not extend beyond the boundary of the cell, and it has an area that is equal to or smaller than that of the cell. When the micro-shape is superimposed on a cell, the resulting cell will have regions of two different densities (e.g., light and dark regions) so that the shape will be visibly apparent if the pixel is presented in a visibly perceptible size.

Barcodes are used in many document creation systems, such as ticketing systems that generate and print tickets for admission to events such as concerts, theater events, conventions, theme parks, sporting events and the like. Thieves may attempt to create counterfeit tickets by making copies of the ticket, including its barcode. Barcodes also may be used for supply chain management applications, to track packages or individual products as they move from manufacturer to distributor to retailer to store shelf.

In the case of commercial barcode theft in supply chain management operations, the thieves must obtain images of valid barcodes for the counterfeiting to work. Each barcode may be unique in that uniquely identifies the product or package on which it is placed. Various ways exist to steal groups of barcodes such as these. One method is "digital" theft, which may include intercepting encrypted data or simply obtaining images of existing barcodes. This might be done in a manufacturing plant, a distribution center, at the point of sale or another location in the supply chain. In such cases, a photo or video of a large number of barcodes may be taken. Current methods to eliminate this attack include using a "scratch off" area that covers the barcode. However, this renders the barcode useless for the supply chain until the barcode is removed, at which point it is becomes susceptible to theft.

To address these and other issues, this document describes a method and system that provides a secure barcode that cannot easily be copied, but which can be captured and decoded using an ordinary barcode scanning application such as the type that may be installed on a smartphone or other portable electronic device. This is achieved by superimposing a secondary pattern on a standard barcode. The secondary pattern does not prevent the barcode from being decoded by a typical barcode scanning application, but it helps to inhibit wholesale copying of the barcode.

Figure 2:
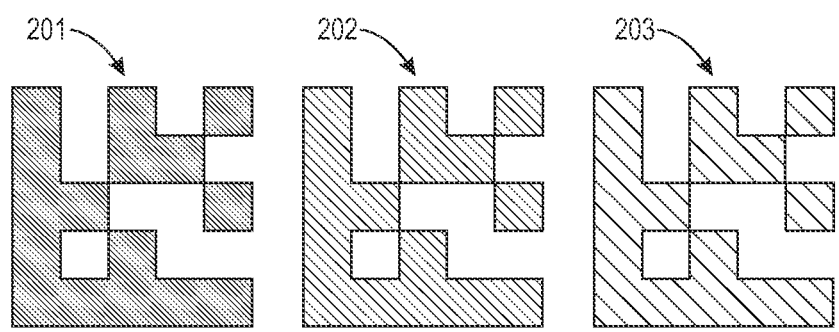
FIG. 2 depicts various embodiments of a barcode having various pixel density levels.

As background, in the context of barcode scanning one may typically assume that the barcode will have a "black" portion and a "white" portion, corresponding to a "black" signal and a "white" signal detected by the application. In actual barcode applications, strict black/white distinctions are not required. Instead, a typical barcode reader may include a gain stage and the simply look for two distinct density levels in the barcode pixels. This is illustrated in the example of FIG. 2, which shows three different embodiments 201-203 of a hypothetical DataMatrix barcode, each of which has different density levels in the contrast between dark cells and light cells. An actual DataMatrix barcode symbol will be 18×18 (or more) cells, but for the purpose of this example we use a 5×5 structure for simplicity of explanation.

FIG. 2 shows that the "black" cells of the 2D barcode do not need to be a solid black as shown in embodiment 201, but could be a grayscale as in embodiment 202 or 203, or as another color or pattern. The light cells of the barcode might also deviate from white, and for this region it may be more appropriate to refer to the two cells groups as "dark" and "light."

For simplicity, this document will only describe a scenario in which the dark cells vary, although other scenarios are possible. In particular, the discussion below describes a scenario in which micro-shapes are superimposed with dark cells of a barcode, but the disclosed embodiments include variations in which micro-shapes are superimposed in light cells of a barcode.

In the present embodiments, the system creates one or more additional patterns in one of the two cell density groups—in this case, in the "dark" cells—in selected areas of the barcode. When doing this, the additional patterns—referred to in this document as "secondary" patterns to distinguish them from the primary pattern of the barcode—are superimposed as micro-shapes on cells in a density group in a region so that all cells in the density group still have substantially the same optical density after the secondary pattern is imposed, while still remaining distinguishable from cells in the other density group. In this way, a homogeneous gain/offset adjustment will result in a compatible barcode for all readers.

Figure 3:
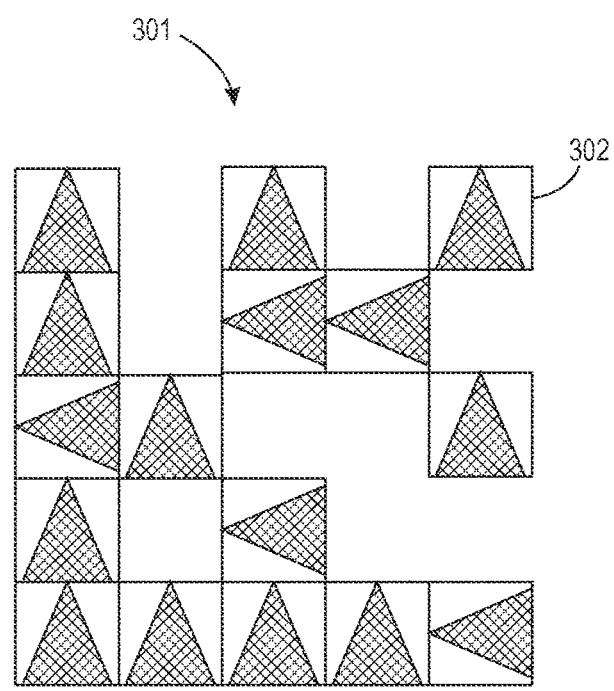
FIG. 3 illustrates an example cell block of a secondary pattern in which micro-shapes have been superimposed on a density region.

A simple example of such a secondary pattern is shown in FIG. 3, which takes the example 5×5 code of FIG. 2 and superimposes a micro-shape (in this case, a triangle positioned in any of various orientations, or a lighter border area that defines such a triangle) on each cell of the darker density region of the barcode. It is understood that there are additional forms of density preserving applications, such as frequency modulation. For simplicity, the embodiment shown in FIG. 3 uses angular encoding to create a barcode 301 having consistent density in the darker region. The micro-shape may be large enough to be detected by a barcode scanning application, but small enough that it is not likely to be copied by most copy devices when operating on a standard (i.e., not high resolution) scanning operation.

When generating the secondary pattern, the type and orientation of the micro-shapes may be selected randomly, or in accordance with any suitable rules. For example, the system may randomly select the orientation of each micro-shape within each cell. The type, orientation and position of the micro-shapes may be stored in a data storage facility in association with the barcode data so that when the barcode data is captured by a barcode scanner, a system may verify that the secondary pattern that is associated with the barcode data is also present on the document. If the secondary pattern is not detected, then the system may assume that the document is a counterfeit and not the copy with the original barcode.

When the system generates the secondary pattern, it may consider any or all of the following constraints: (1) the angular encoding may be required to maintain a consistent density for all cells of a particular density set; (2) the micro-shape used in the secondary pattern may preserve the outline of each cell to facilitate reading (shown in FIG. 3 as a black outline for each darker region cell 302); (3) the system may use a pattern that will have a low likelihood of being preserved through copying; and (4) the system may generate an augmented barcode having a synchronization capability mirroring that of the original barcode. The micro-shapes of the secondary pattern may all be oriented in a single direction. Or, as shown in FIG. 3, the orientation of the micro-shapes may vary among the cells in which the micro-shapes are superimposed.

The system may generate a secondary pattern that satisfies the first three constraints via any number of suitable methods, such as by: (i) maintaining a library of suitable micro-shape templates and selecting a micro-shape template from the library when generating the secondary pattern; (ii) by generating micro-shapes in real time in accordance with various rules relating to border preservation, density and consistency; or (iii) other methods.

As to the synchronization constraint, as background is helpful to understand that in order to facilitate recognition, 2D barcodes have a synchronization pattern. For example, in a DataMatrix barcode the synchronization pattern may be a solid line at the bottom and left borders of the code, and a broken or alternating line at the top and right borders of the code. This is shown in example 401 of FIG. 4. For a QR Code 411, the synchronization pattern is a rectangular "bullseye" in three corners and the smaller version for larger versions of the QR Code.

Figure 4:
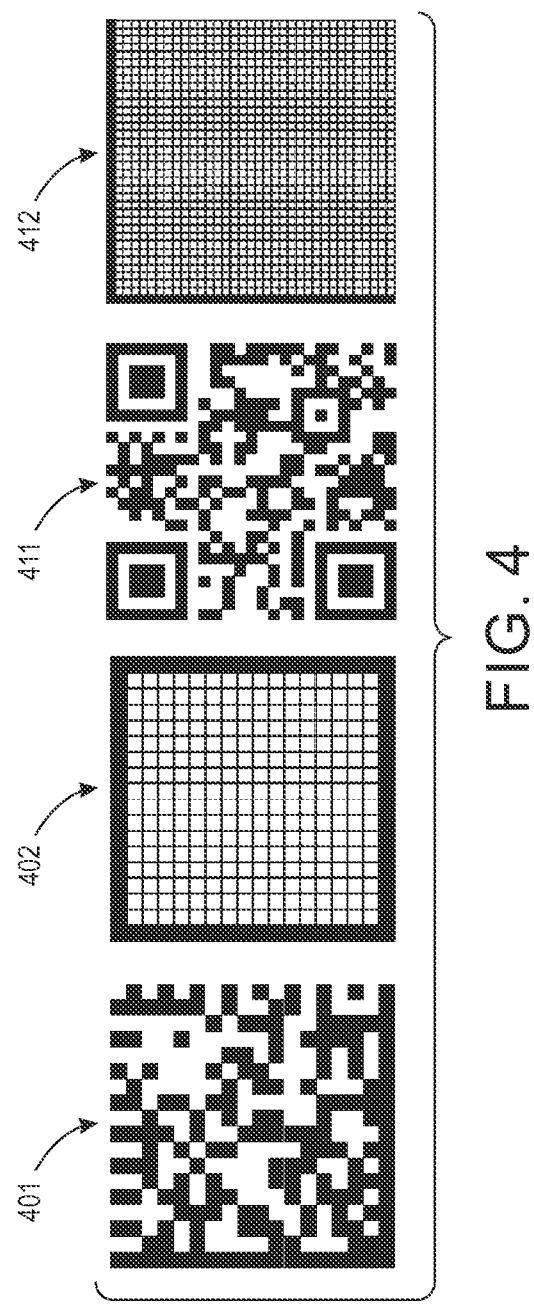
FIG. 4 illustrates two examples of barcodes and corresponding synchronization.

The system may use the primary pattern of the standard barcode to identify the location of the barcode, but it will add a secondary pattern overlaying the barcode using a synchronization pattern that is independent from the primary pattern. FIG. 4 shows two examples in which a 20×20 unit synchronization pattern 402 is shown for DataMatrix code 401, as well as a 16×16 unit synchronization pattern 412 for QR Code 411. As with the micro-shapes, the synchronization patterns may be stored in a data store in association with an underlying barcode type, generated in real time based on various rules, or created or identified using other suitable techniques.

An example of a synchronization component may be a frame of polarity of 1 around the data field, as shown in the frame 515 along the top and left sides of synchronization component 512 in FIG. 5, which will be described in more detail below. One aspect of the synchronization design is a component that can be represented over the underlying barcode, as is shown by example by the synchronization frame. The synchronization area defines the polarity of the signal, making reading possible regardless of the overall image rotation. The use of a synchronization pattern is not mandatory since the underlying barcode in general has a synchronization component, but it can help in registration, polarity and the definition of the actual capacity of the secondary layer.

Figure 5:
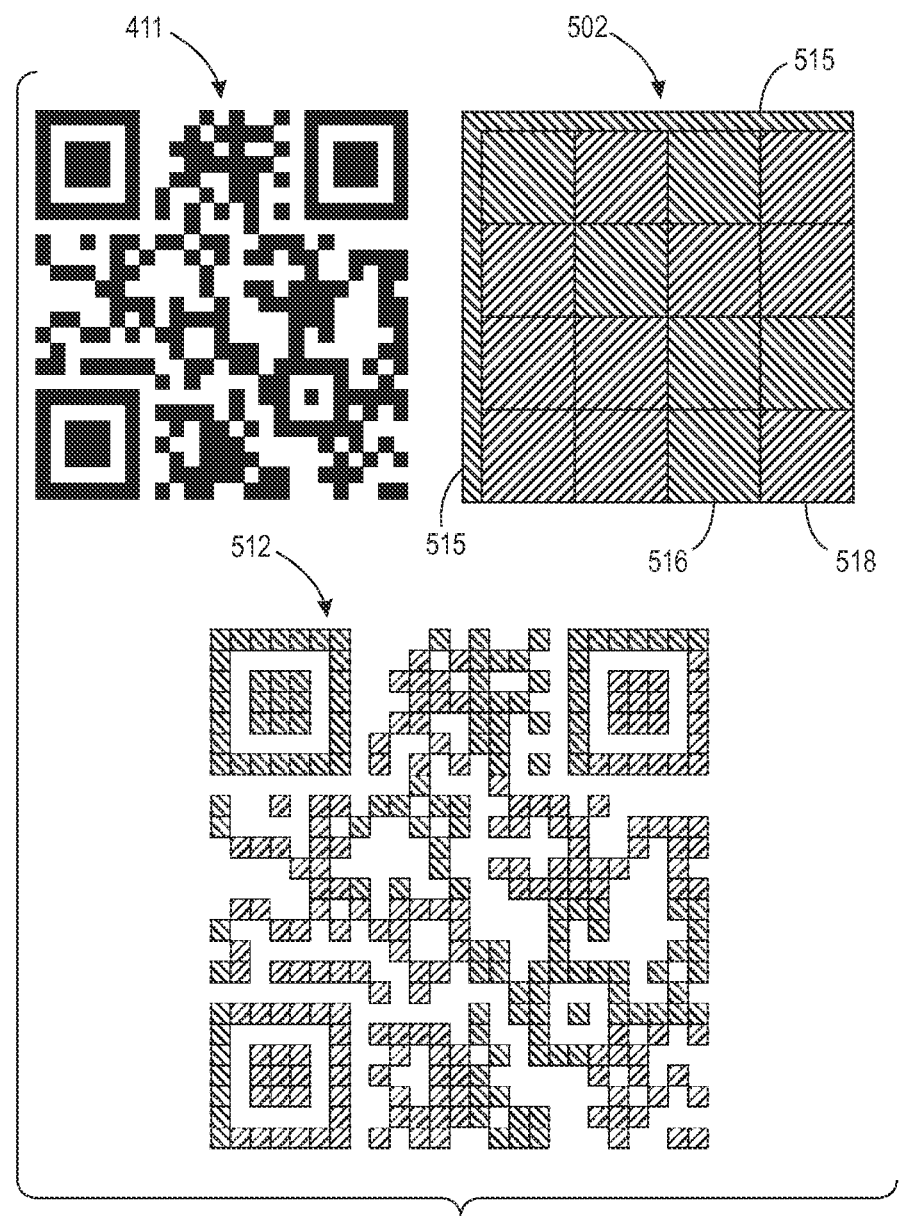
FIG. 5 illustrates one the barcodes of FIG. 4, along with a synchronization pattern and an augmented barcode to which the synchronization pattern has been applied.

As shown in FIG. 5, when creating a secondary pattern 512, the system may group individual cells of the synchronization pattern into "supercells" (i.e., blocks of N×N cells, as exemplified by cell blocks 516 and 518) and apply a single encoding protocol (i.e., micro-shape and corresponding density region) per "supercell" cell block. The number of supercells will be determined by dividing the overall border dimension of the primary barcode into a number of equally-sized subcells. For example, a 20×20 barcode may contain supercells having a 5×5 size, and a 16×16 barcode may contain supercells having a 4×4 size. All pixels within a cell block will contain the same micro-shape to preserve density in a region, but different cell blocks in a secondary pattern may contain different micro-shapes. This results in a modulated, tiled secondary pattern of microshapes that may be superimposed on the primary pattern of the original barcode when printed or displayed. As a simple example, FIG. 5 illustrates the bit string [1010010000110010] encoded as a primary pattern in a QR Code 411, along with a secondary pattern layer 502. When the QR code 411 is combined with the secondary pattern layer 502 by overlaying one pattern with the other, an augmented barcode 512 results.

To decode an augmented barcode containing a primary pattern and a superimposed secondary pattern of micro-shapes, a barcode scanning application may receive an image of a barcode and process the image through an orientation filter whose output is high (i.e., close to 1) for input patterns of a single predetermined angular orientation and low (i.e., close to 0) for input patterns of all other orientations. In one embodiment, the binary bitstream may be encoded by modulating fine line patterns to +/−45°, and if so a Histogram of Oriented Gradients (HOG) filter tuned to a 45° orientation may be employed in the mobile device's decoder. The output from the HOG filter may be binarized and processed through morphological operations (such as erosion followed by dilation) to remove noise and unwanted structure. The device may calculate weighted supercell averages and perform another adaptive thresholding operation to generate the binary bit sequences that correspond to the bit string that is encoded in the barcode.

Figure 6:
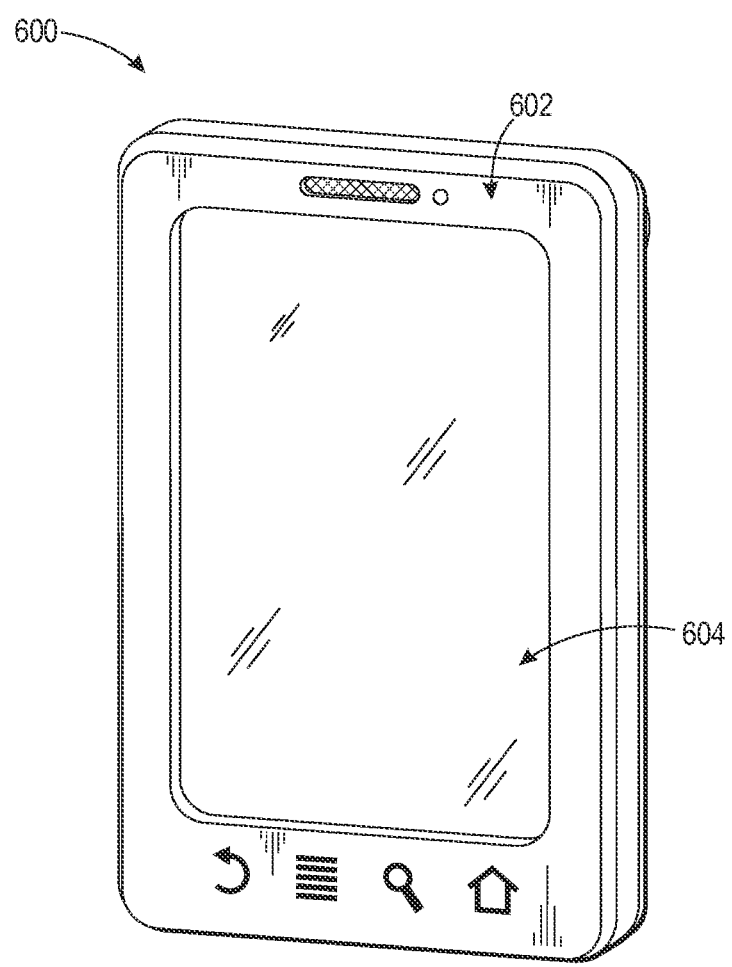
FIG. 6 depicts a first or front face of a mobile electronic device that includes a hardware configured to capture and display an image according to an embodiment.
Figure 7:
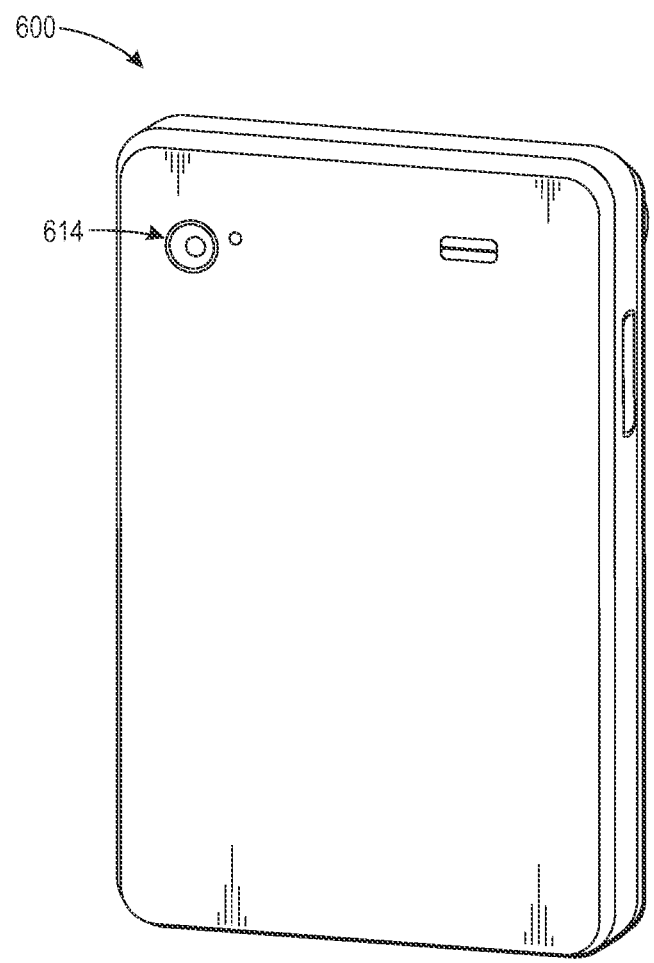
FIG. 7 depicts a second or rear face of the mobile electronic device of FIG. 6.

FIG. 6 shows one example of a mobile electronic device 600 that may be used to decode a barcode. The mobile electronic device 600 may include a front face 602 and a display 604. The device also may include a user interface such as a keypad, audio input, and/or touch-sensitive components of the display 604. The device will include a processor and a non-transitory, computer readable memory containing programming instructions that, when executed by the processor, cause the device to perform various functions, such as barcode scanning operations FIG. 7 shows a rear face of the mobile electronic device 600. The rear face may include an image capture device 614. The image capture device 614 may be any suitable component capable of receiving an optical image and transmitting the information to other components for processing. The image capturing device may serve as an optical sensor to capture an image that is used by a barcode scanning application. While the image capture device 614 is depicted on the rear face of this example, persons skilled in the art will appreciate that the image capture device 614 may be positioned at any location upon any face of the mobile electronic device 600, or it may even be external to the mobile device 600 and connected by any means of electronic communication, including, but not limited to, physical cable communication such as universal serial bus (USB), wireless radio communication, wireless light communication, or near field communication technology.

The configuration of the mobile device 600 as shown in FIGS. 6 and 7 is only an example, and persons skilled in the art will appreciate other configurations that are able to achieve a similar overall result. The image capture and display process described above may be many other electronic devices having an image sensor and a display. The electronic device also will include internal hardware for implementing programming instructions, such as that memory containing such instructions, along with one or more processors that executed the instructions. As used in this document, unless the context specifically indicates otherwise, the word "processor" may refer to a single processor or a number of processors that together implement a process.

Figure 8:
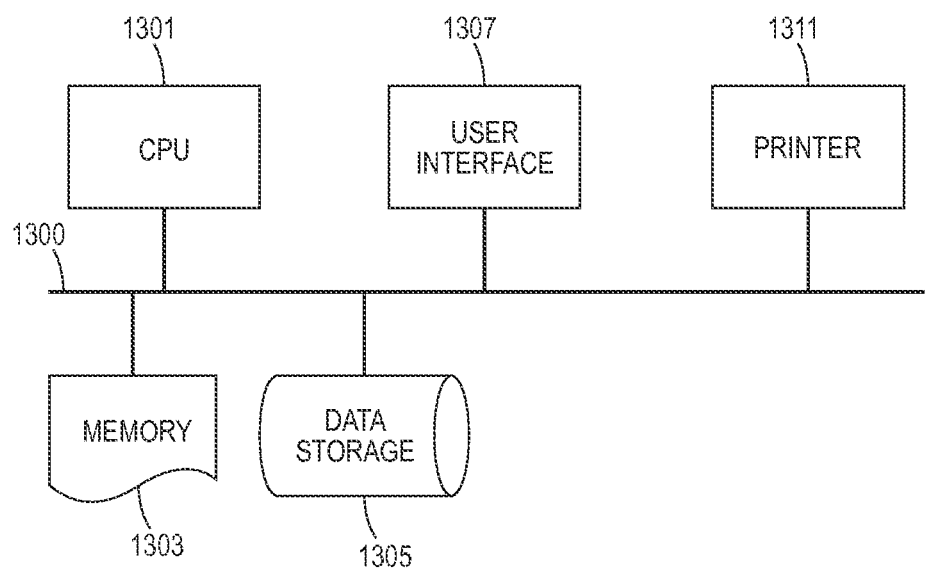
FIG. 8 is a block diagram representing various hardware elements that may be used to generate an augmented barcode.

FIG. 8 depicts a block diagram of hardware and/or electronics that may make up a system that generates an augmented barcode, develops instructions printing it, and prints the combined mark. One or more communications lines 1300 such as a bus (for a single device) or network (for multiple devices) may interconnect the illustrated components and allow data and/or signals to flow between the components. CPU 1301 represents one or more processors that perform calculations and logic operations required to execute a program. Any number of processors may be available, and they may be part of a single electronic device or distributed across any number of networked electronic devices. When this document and its claims uses the term "processor," unless specifically stated otherwise it is intended to refer to all such embodiments (i.e., single processor or multiple processors). The processor(s) may access a computer-readable memory device 1303 containing programming instructions, along with a data storage facility 1305 such as a database that stores the package generation templates and/or rule sets.

A user interface 1307 is a device or system that provides output to, and receives input from, a user. The user interface may include a display, audio output, a printer, or another element that provides information to a user. The user interface 1307 also may include a touch-sensitive component, microphone, audio port, keyboard, mouse, touch pad, or other input mechanism that is capable of receiving user input. The system also may include one or more printing devices 1311, each of which contains hardware that enables it to print marks on a substrate.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of generating a secure barcode, comprising, by a processor:
   identifying a primary pattern for a two-dimensional barcode to be printed on a substrate, wherein the primary pattern comprises of a set of dark cells and a set of light cells;
   identifying a two-dimensional micro-shape, wherein the micro-shape has a size that is no larger than a size of each cell of the two-dimensional barcode;
   generating a secondary pattern comprising a plurality of the micro-shapes by at least selecting orientation of the micro-shapes so that the micro-shapes, when superimposed with the primary pattern, will exhibit varying orientations;
   superimposing the secondary pattern with the primary pattern for the two-dimensional barcode to yield a secure barcode so that each micro-shape is positioned within one of the cells of the primary pattern and so that each cell of one of the sets includes one of the micro-shapes; and
   storing a file comprising instructions to output the secure barcode with the primary pattern and the superimposed secondary pattern.

2. The method of claim 1, further comprising:
   by a processor, transmitting a command to a printer to print secure barcode with the primary pattern and the superimposed secondary pattern; and
   by the printer, printing the secure barcode on a substrate.

3. The method of claim 1, wherein superimposing the secondary pattern with the primary pattern for the two-dimensional barcode comprises:
   identifying a plurality of cell blocks in the two-dimensional barcode; and
   for each cell of a particular density level in a particular cell block of the two-dimensional barcode that, when printed, will include a data element, replacing the cell with the micro-shape.

4. The method of claim 1, wherein generating the secondary pattern comprises replacing each cell in the set of dark cells with one of the micro-shapes so that all of the dark cells of the barcode maintain a substantially uniform density after the superimposing is complete.

5. The method of claim 1, wherein generating the secondary pattern comprises replacing each cell in the set of light cells with one of the micro-shapes so that all of the light cells of the barcode maintain a substantially uniform density after the superimposing is complete.

6. The method of claim 1, wherein superimposing the secondary pattern with the primary pattern for the two-dimensional barcode comprises:
   selecting a micro-shape template from a library of micro-shape templates; and
   applying the selected micro-shape template to the primary pattern.

7. The method of claim 1, wherein generating the secondary pattern comprising the sequence of the micro-shapes comprises:
   identifying a synchronization pattern for the two-dimensional barcode;
   identifying a set of cell blocks within the synchronization pattern; and
   applying the micro-shape to a plurality of cells within each of the cell blocks.

8. A barcode generation system, comprising:
   a processor; and
   a non-transitory computer-readable medium containing programming instructions that, when executed, cause the processor to:
     identify a primary pattern for a two-dimensional barcode to be printed on a substrate, wherein the primary pattern comprises of a set of dark cells and a set of light cells;
     identify a two-dimensional micro-shape, wherein the micro-shape has a size that is smaller than each cell of the primary pattern;
     generate a secondary pattern comprising a sequence of the micro-shapes by at least selecting orientation of the micro-shapes among the cells so that the micro-shapes, when superimposed with the primary pattern, will exhibit varying orientations;
     superimpose the secondary pattern with the primary pattern for the two-dimensional barcode to yield a secure barcode so that each micro-shape is positioned within one of the cells of the primary pattern and each cell in one of the sets contains one of the micro-shapes; and
     store a file comprising instructions to output the secure barcode with the primary pattern and the superimposed secondary pattern.

9. The system of claim 8, further comprising:
a printer; and
additional programming instructions that, when executed, cause the processor to transmit a command to the printer to print the secure barcode on a substrate.

10. The system of claim 8, wherein the instructions to superimpose the secondary pattern with the pattern for the two-dimensional barcode comprise instructions to:
identify a plurality of cell blocks in the two-dimensional barcode; and
for each cell of a particular density level in a particular cell block of the two-dimensional barcode that, when printed, will include a data element, replace the cell with the micro-shape.

11. The system of claim 8, wherein the instructions to superimpose the secondary pattern onto the primary pattern for the two-dimensional barcode further comprise instructions to superimpose one of the micro-shapes with each of the dark cells of the barcode so that all of the dark cells of the barcode maintain a substantially uniform density after the superimposing is complete.

12. The system of claim 8, wherein the instructions to superimpose the secondary pattern with the primary pattern for the two-dimensional barcode further comprise instructions to superimpose one of the micro-shapes with each of the light cells of the barcode so that all of the light cells of the barcode maintain a substantially uniform density after the superimposing is complete.

13. The system of claim 8, further comprising:
a library of micro-shape templates;
wherein the instructions to superimpose the secondary pattern with the primary pattern for the two-dimensional barcode comprise instructions to select a micro-shape template from the library and apply the selected micro-shape template to the primary pattern.

14. The system of claim 8, wherein the instructions to generate the secondary pattern comprising the sequence of the micro-shapes comprise instructions to:
identify a synchronization pattern for the two-dimensional barcode;
identify a set of cell blocks within the synchronization pattern; and
apply the micro-shape to a plurality of cells within each of the cell blocks.

15. A two-dimensional barcode, comprising:
a primary pattern comprising a set of dark cells and a set of light cells that represent encoded data; and
a secondary pattern superimposed with the primary pattern, wherein the secondary pattern comprises a plurality of micro-shapes superimposed on each cell within one of the sets of cells so that:
each micro-shape has a size that is no larger than a size of each cell of the primary pattern,
the micro-shapes exhibit varying orientations, and
all cells in the set of cells contain the same micro-shape and thus have substantially the same optical density.

* * * * *